United States Patent
Mahony

(10) Patent No.: US 7,908,790 B2
(45) Date of Patent: Mar. 22, 2011

(54) MOUSE AND RODENT TRAP

(76) Inventor: Michael J. Mahony, Hallam (AU)

(*) Notice: Subject to any disclaimer, the term of this patent is extended or adjusted under 35 U.S.C. 154(b) by 246 days.

(21) Appl. No.: 12/376,480

(22) PCT Filed: Aug. 7, 2007

(86) PCT No.: PCT/AU2007/001106
§ 371 (c)(1),
(2), (4) Date: Feb. 5, 2009

(87) PCT Pub. No.: WO2008/017110
PCT Pub. Date: Feb. 14, 2008

(65) Prior Publication Data
US 2010/0223836 A1 Sep. 9, 2010

(30) Foreign Application Priority Data
Aug. 8, 2006 (AU) .............................. 2006904287

(51) Int. Cl.
*A01M 23/30* (2006.01)
*A01M 23/24* (2006.01)
(52) U.S. Cl. .............................................. 43/81; 43/58
(58) Field of Classification Search ................ 43/58, 77, 43/81, 81.5, 82, 83, 83.5; *A01M 23/24, 23/30*
See application file for complete search history.

(56) References Cited

U.S. PATENT DOCUMENTS

| 615,218 | A | * | 11/1898 | Hotchkiss | 43/81 |
| 722,842 | A | * | 3/1903 | Hooker | 43/83 |
| 726,350 | A | * | 4/1903 | Robinson | 43/83.5 |
| 749,380 | A | * | 1/1904 | Hazel | 43/83 |
| 1,039,001 | A | * | 9/1912 | Winkler | 43/83.5 |
| 1,927,470 | A | | 9/1933 | Richardson | |
| 2,260,872 | A | | 10/1941 | Schmidt | |
| 3,394,488 | A | | 7/1968 | Kruger | |
| 4,472,904 | A | * | 9/1984 | Wasielewski | 43/81 |
| 4,483,093 | A | | 11/1984 | Isborn | |
| 5,001,857 | A | * | 3/1991 | McDaniel et al. | 43/81 |
| 5,960,583 | A | | 10/1999 | Hansson | |

FOREIGN PATENT DOCUMENTS

AU       100692      4/1937

* cited by examiner

*Primary Examiner* — Kimberly S Smith
*Assistant Examiner* — Marisa Conlon
(74) *Attorney, Agent, or Firm* — Richard M. Goldberg

(57) ABSTRACT

A rodent trap includes a base, a hoop pivoting relative to the base having a first and a second position, a bias arrangement, a retaining bar pivoting relative to the base and having a setting and a releasing position, a release arrangement comprising an over-center pivotally mounted keeper having first and second positions, the retaining bar including a locking lip to retain the hoop in a first set position when the retaining bar is in the setting position, the release arrangement for mounting a bait and release the retaining bar when subject to an upward force on the bait, the retaining bar automatically set to the setting position by drawing the hoop down onto the retaining bar against the bias and the retaining bar engaging a retaining lip of the release arrangement.

7 Claims, 3 Drawing Sheets

MOUSE AND RODENT TRAP

CROSS-REFERENCE TO RELATED APPLICATIONS

The present application claims priority from Australian Provisional Patent Application No 2006904287 filed on 8 Aug. 2006, the content of which is incorporated herein by reference.

INTRODUCTION TO THE INVENTION

This invention relates to traps for catching and euthanizing mice, rats and other small rodent pests and in particular, relates to an improved release configuration for a conventional mouse and rat trap.

BACKGROUND TO THE INVENTION

Rats and mice are well known rodents capable of substantial damage to property and public health and the extermination of unwanted rodents is a wide-spread need both on a domestic and commercial scale.

Whilst endless attempts, designs and variations of mouse and rat traps have been provided and are a source of constant innovation and development, the traditional mouse and rat trap still dominates the trap market for dealing with unwanted rodents. The traditional trap is based on a simple design with a wire hoop being held in a tensioned or biased position by way of a retaining bar, in turn held by a release mechanism, where the release mechanism is adapted for holding bait such that interference with the bait by a rat or mouse, activates the release means to release the retaining bar, thereby allowing the wire hoop to fly forward over the top of the release means, capturing and euthanizing the animal interfering with the bait. Whilst the traditional trap mechanism has a measure of reliability, it is not fail proof and often rats and mice are able to learn and adapt to take the bait from the release mechanism without activation thereof and thereby retrieve the bait from the trap without releasing the wire hoop and escaping without being trapped.

Close observation of the jaw and tooth anatomy of a rat and mouse, reveals that the incisors formed as a foremost teeth in rats and mice appear to be the primary teeth used by rodents in attacking the bait provided on traps. Further investigations into the configuration of the upper and lower incisors and the gnawing action of such rodents, shows that the sharp bevel shaped cutting edge formed in both the upper and lower incisors is used in conjunction with the ability of rats and mice to move their lower jaws forward, such that the lower incisors are positioned in front of the upper incisors. As such, when a rat or mouse endeavours to attack bait mounted to the release means of a trap, it is often the case that the rodent has either learnt or by some other means, to use a gnawing or bruxing action whereby the lower incisors are cause to draw in an upward or lifting action onto the bait, rather than a downward action on the bait. The mode of action of the standard release means found on most rat and mouse traps requires a downward action in order to release the retaining bar. Accordingly, if a rat or mouse either learns or by whatever means, attacks the bait on a trap and avoids pushing down on the bait but instead tends to lift up on the bait in order to gnaw or release the bait, there is a very good chance that the rodent may avoid the necessary downward pressure on the release means and thereby avoid activating the trap.

In addition to the above limitations found in many prior art traps an additional problem exists with the setting of such traps which often expose the user to having their fingers caught in the trap by inadvertently releasing the trap during setting or failure to set the trap properly before placement on the ground or other types of mishandling situations. It would be desirable to provide a rodent trap overcoming the above difficulties and limitations.

One object of this invention is to provide an improved trap.

STATEMENTS OF THE INVENTION

In a first aspect the invention provides a rodent trap comprising a base for mounting the trap components, a hoop pivotally mounted relative to said base and adapted to move between a first set position against a bias and a second released position by the action of said bias, a retaining bar pivotally mounted relative to said base, forward of said hoop when in said set position, for movement between a setting position and a releasing position, and a release means comprising an over-centre pivotally mounted keeper adapted for movement between a first retaining and second release positions, said retaining bar including a locking lip formed over said pivot configured to retain said hoop in said first set position when the retaining bar is in said setting position, by simultaneous cooperation with said release means wherein said release means is adapted to mount a bait for said rodent and release said retaining bar when subject to upward force on said bait wherein said retaining bar can be automatically set to said setting position by drawing said hoop down onto said retaining bar against said bias so as to cause said retaining bar to engage a retaining lip of said release means and set the trap.

The release means includes a keeper pivotally mounted rearward of said hoop pivot point for pivoted movement between a first retaining position and a second release position, a retaining lip for cooperating with said retaining bar and a bait mounting wherein said retaining lip cooperates with said retaining bar when the keeper occupies said first position with the retaining lip being positioned over-centre of said pivot so as to hold said keeper in the first position until an upward force on the bait pivots the keeper toward the second position thereby drawing said retaining lip away from said retaining bar to release the wire hoop.

In another aspect the invention provides a release means for a rodent trap comprising a keeper adapted for pivotal mounting rearward of a hoop pivot point for pivoted movement between a first retaining position and a second release position of said hoop, a retaining lip for cooperating with a retaining bar and a bait mounting wherein said retaining lip cooperates with said retaining bar when the keeper occupies said first position with the retaining lip being positioned over-centre of said pivot so as to hold said keeper in the first position until an upward force on the bait pivots the keeper toward the second position thereby drawing said retaining lip away from said retaining bar to release the wire hoop.

DETAILED DESCRIPTION OF THE INVENTION

The invention will now be described with reference to one particularly preferred embodiment with reference to the leg-end and FIGS. 1 to 5.

| Legend | |
|---|---|
| 1. | Base |
| 2. | Hoop |
| 3. | Spring |

-continued

| Legend | |
|---|---|
| 4. | Retaining Bar |
| 5. | Release means |
| 6. | Bait |
| 7. | Keeper |
| 8. | Keeper pivot |
| 9. | Hoop pivot |
| 10. | Retaining lip |
| 11. | Bait Mounting |
| 12. | Top or bridging Portion |
| 13. | Anchor |
| 14. | Pivot slot |
| 15. | Retaining bar pivot |
| 16. | Locking lip |
| 17. | Notch |
| 18. | Retaining bar bias |
| 19. | Hoop sides |
| 20. | Hoop bias |
| 21. | Hoop return |
| 22. | Chassis |
| 23. | Retaining bar stop |
| 24. | Release means stop |
| 25. | Fitting tabs |

FIG. 5 shows a template blank for the optional chassis.

Figure 1:
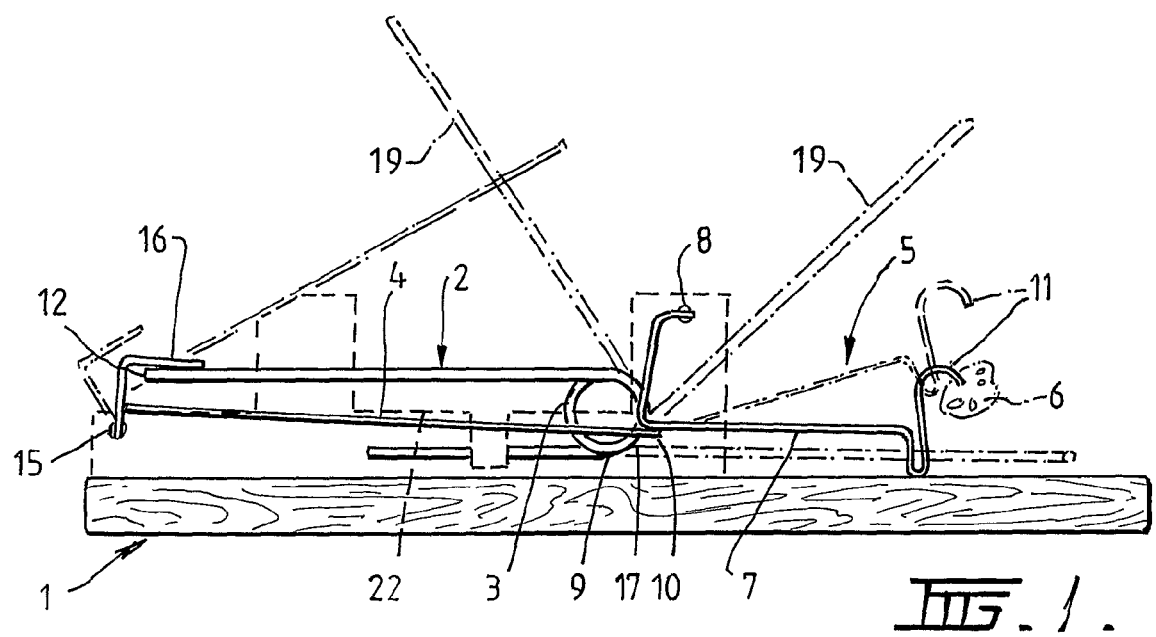
FIG. 1 shows a side view of a set trap with the release action shown in phantom.
Figure 2:
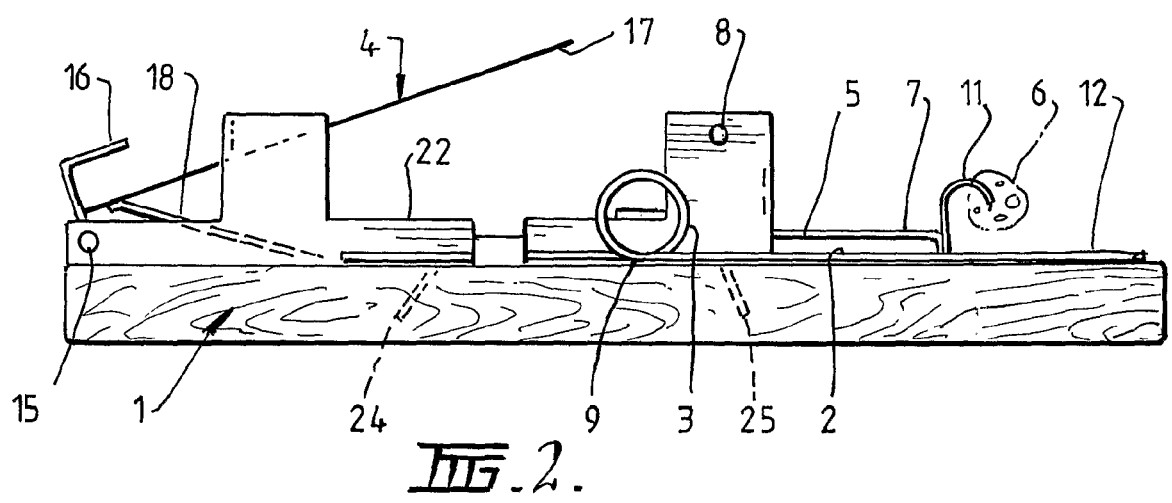
FIG. 2 shows a side view of a released trap.

Referring firstly to FIGS. 1 and 2, a particularly preferred embodiment of the rodent trap of the invention is shown in a set mode ready for release by a rodent, upon interference with the bait. The rodent trap includes a generic base 1 formed of wood, plastic or any other suitable material providing stability, weight and a basis for mounting the various functional components of the trap. In a particularly preferred embodiment, the trap includes an optional chassis 22 for mounting the trap mechanics and subsequent fitting to the base. The fitting may be provided by integral fitting tabs 25 punched out of the bottom of the chassis. The trap includes a range of components well known to the standard and generic mouse trap, including an activatable hoop 2 generally formed of wire, which is pivotally mounted relative to the base and adapted to swing backward and forward through an arc and move between a first set position shown in FIG. 1, and a second released position shown in FIG. 2. In the first position the hoop is drawn back against a biasing means in the form of a spring 3 and held there under tension by the action of a retaining bar 4. The retaining bar takes the form of an elongate flat section bar which is mounted relative to the base 1 via a pivot 15, forward of the position of the wire hoop 2, when the wire hoop is in its set or first position. The retaining bar includes a return locking lip 16 formed at the far or pivoted end and a notch 17 formed at the near end, being the end adapted for cooperation with the release means, with the notch 17 adapted to engage the retaining lip 10 of the release means 5 so as to hold the retaining bar in the set position. The particular configuration and juxtaposition of the top or bridging portion 12 of the wire hoop 2 and the configuration of the locking lip 16 of the retaining bar 4 is such that when the wire hoop 2 is pushed down onto the retaining bar 4, it is able to bypass the locking lip 16 with the retaining bar adopting a preset position with a notch 17 being positioned slightly higher than the retaining lip 10 of the release means 5 by way of a spring 18 or other biasing means. The travel of the retaining bar in the release position is limited by stops 23 so as to allow free traversal by the hoop during setting of the trap. During setting, the wire hoop 2 is pushed down past the locking lip 16 onto the retaining bar 4 where a small amount of pressure causes the retaining bar 4 to move downward against the action of the bias or spring 18 so as to cause the notch 17 to engage the retaining lip 10 whereby the pivotal action of the retaining bar contemporaneously causes the locking lip 16 to rotate about the pivot point 15 so as to then engage the top portion 12 of the wire hoop 2 and by the cooperative action of the locking lip holding the top or bridging portion 12 of the wire hoop and the bias action of both the hoop and the retaining bar drawing the retaining bar up against the retaining lip 10 of the release means 8, the whole trap is set and ready for release. The release means takes the form of a keeper 7 pivotally mounted at a height above that of the pivot point 9 for the wire hoop such that the keeper pivot 8 is also positioned rearward of the hoop pivot point 9 with the keeper being adapted to move between a first retaining position as shown in FIG. 1 and a second release position shown in FIG. 2. The keeper is provided with a retaining lip 10 being the point of cooperation with the retaining bar notch 17 such that the retaining lip 10 of the keeper 7, in the retaining position, is positioned over-centre of the pivot point 8 such that the forces brought to bear on the retaining bar 4 as it retains the wire hoop 2 against the bias of the spring 3 causes the retaining bar 4 to lift up and contact the retaining lip 10 of the keeper 7 whereby the over-centre positioning of the retaining lip urges the keeper to rotate about the pivot point 8 and bear down on the base 1 at the point removed from the retaining lip at the bait mount point 11 holding the bait portion 6. In this manner, once the trap is set, it adopts a stable configuration with the biasing of the wire hoop being transferred through the previously described componentry to the release means 5 urging the baited portion of the release means to bear down on the base 1 of the trap.

Referring now to FIG. 2, the trap is shown in the release mode, where the hoop 2 has moved to the release position by the action of the spring 3, which instantly draws the hoop across the trap, through the retaining bar 4 and down to the rearward side of the base, thereby trapping and in most cases, euthanizing a rat, mouse or other rodent caught in the trap. The releasing of the wire hoop 2 is effected by a rodent or other animal approaching the bait 6. In the animal's endeavour to eat the bait, it has been observed that the action of the mouth of a mouse or rat, reveals that in many cases, the animal approaching and endeavouring to consume the bait, will bite the bait 6 by an upward action of the lower incisors against the bait 6. The upward action of the animal's biting of the bait thereby urges the rearward portion at the bait mount 11 of the keeper 7 to draw the keeper up, thereby rotating the keeper about the pivot 8 and drawing the retaining lip 10 away from the retaining bar 4; wherein, the instant retaining lip 10 is withdrawn from the notch 17 of the retaining bar 4, the bias of the wire hoop, in the set or first position, is instantly released with the retaining bar lifting up so as to rotate the locking lip 16 sufficiently to release the top portion 12 of the wire hoop. The wire hoop then instantly rotating over the top of the release means and hopefully euthanizing the animal as it is attempting to release the bait 6.

Figure 3:
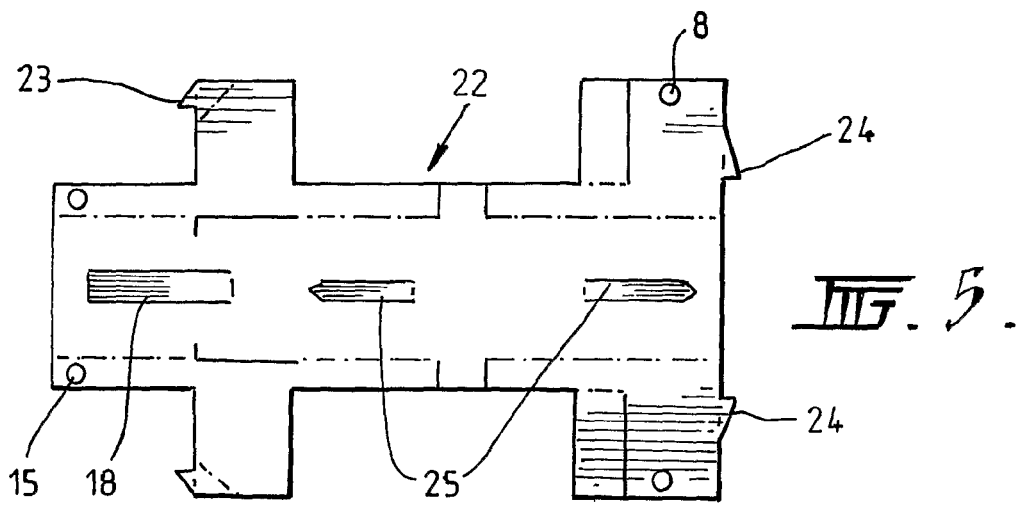
FIG. 3 shows a perspective view of a set trap
Figure 3:
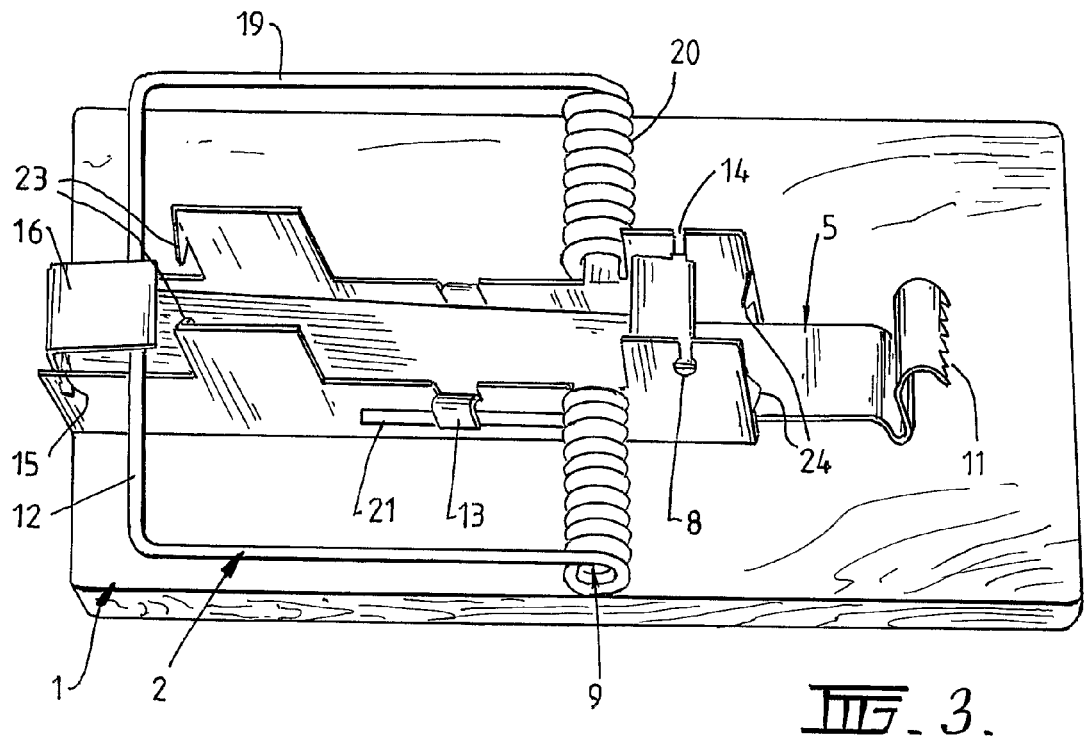

The particular details of the release means is shown in FIGS. 1 and 3 where the release means of the invention can be seen to function to provide a mechanism for release, operating in response to the reverse forces required to release the conventional or common release means of the well known mouse trap. The release means of the invention in the one particularly preferred embodiment of the invention shown and explained above is provided in FIGS. 1 and 3, where the keeper comprises a shaped plate of similar dimensions to the standard mouse trap keeper, but the plate is configured in a specific manner with its pivot point 8 raised above the level of the wire hoop pivot 9, such as to allow the keeper of the invention to function by a lifting action for release of the retaining bar, in contrast to the reverse action as found in the release means of a traditional mouse trap. The keeper is provided with the retaining lip 10 formed along one edge thereof, such that the retaining lip is bent forward of the pivot 8 with the remainder of the keeper being positioned underneath the pivot 8 rearward of the hoop pivot 9. In this particular configuration, the keeper allows for the activation by a lifting motion at the bait mount 11 so as to cause the keeper to pivot around the pivot point 8 thereby drawing the retaining lip 10 away from its over-centred position and thereby releasing the retaining bar 4.

Figure 4:
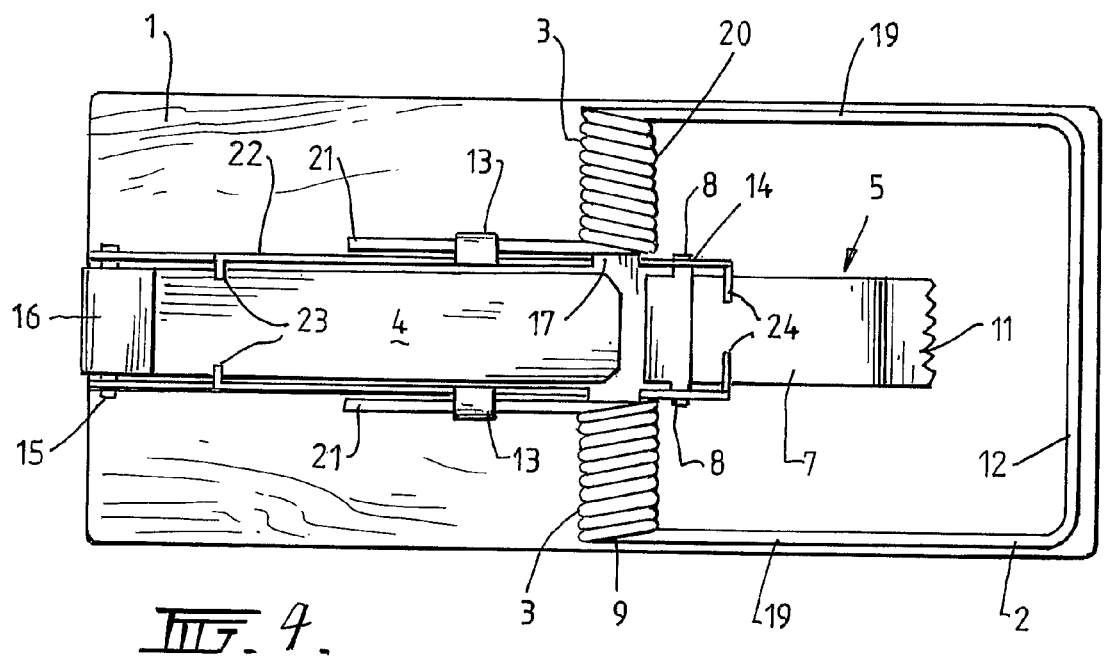
FIG. 4 shows a plan view of a released trap.
Figure 6:
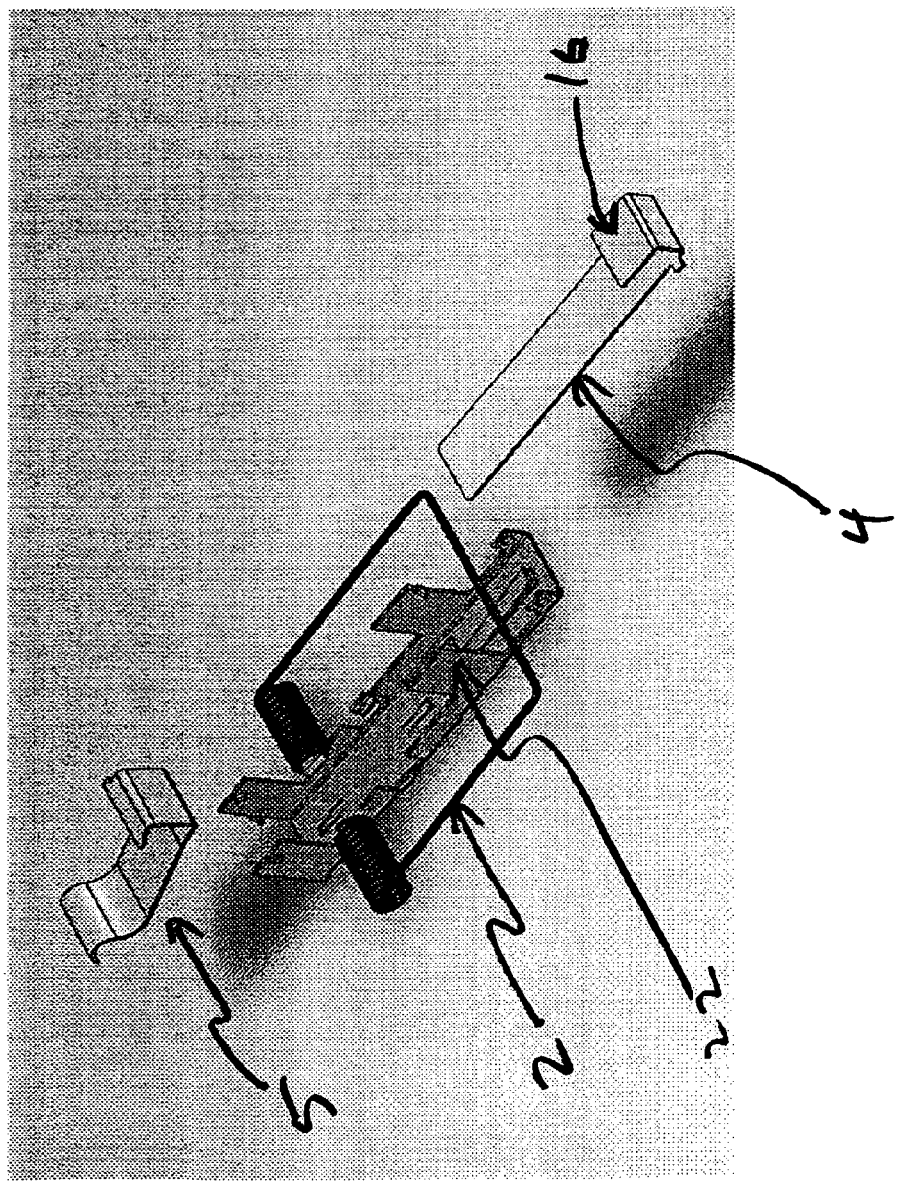
FIG. 6 shows an exploded view of the optional chassis and trap mechanicals.

Referring now to FIG. 4, a plan view is shown of the trap where the particular configuration of the retaining bar 4 and its relationship with the wire hoop and release means can be seen clearly. The wire hoop 2 is particularly configured to include the principal hoop made up of the top portion 12, two hoop sides 19, two hoop bias or springs 20 and two hoop returns 21 held by anchors 13 formed in the side of the chassis. This particular configuration of the hoop allows for insertion and placement of the retaining bar 4 down along the middle length of the hoop, thereby allowing the retaining bar to operate in both the set and release positions, with a very small arc of movement about its pivot 15. The very small arc of movement between the set and released functions of the retaining bar, provides for the facility of allowing the trap to be automatically set by the action of simply drawing the wire hoop over the retaining bar and, as shown in FIGS. 1 and 3, by gently pushing the wire hoop down onto the retaining bar so as to engage the release means by causing the notch 17 to draw against retaining lip 10 thereby gently lifting the release means 5 about its pivot 8. Once the retaining bar is pushed down over the retaining lip, the release means automatically drops by the action of gravity, so as to engage the notch 17 and the simultaneous rotational movement of the locking lip 16 thereby also engages the top portion 12 of the hoop and in so doing, allows the trap to be automatically set without causing the user's fingers to be in any way positioned or endangered by the inadvertent movement of the pre-stressed hoop. The small arc of movement is provided by the retaining bar stops 23 formed in the chassis 22. The chassis functions to mount all the trap mechanicals in one simple unit with the chassis simply fitted to the trap base. The bar stops 23 may be formed as a tab projecting from the housing configured to allow ready assembly of the trap mechanicals whilst serving to capture the retaining bar once fitted.

Referring now to FIG. 5, the template or blank of the optional chassis is shown. The chassis is preferably manufactured from a steel plate with a degree of spring or resilience inherent in the materials. The chassis is formed by pressing the blank or template into the shape as shown in the particularly preferred embodiments of FIGS. 1 through to 4. The incorporation of the optional chassis greatly enhances and simplifies the manufacturing and production of the trap of the invention by allowing a one step operation where the chassis is pressed and the spring steel allows the integral corporation from within the chassis of the retaining bar bias 18 which is simply pressed out from the bottom of the chassis so as to form an upward rising spring onto which the retaining bar sits. In addition, the chassis can incorporate fitting tabs 25 which can again be punched out from the bottom of the chassis and allowing a ready means of fitting the chassis to the base 1. The retaining bar stops 23 formed in the side of the chassis as well as the analogous stops 24 for the release means are formed as simple tabs on the outward projecting sides of the chassis such that the chassis provides a highly simplified assembly of the various components by allowing the retaining bar 4 and release means 5 to be simply placed into the channel formed once the chassis is shaped with a retaining bar being fitting into its pivot 15 by sliding down the pivot slot 14 whereby the retaining bar can then be pushed down passed the retaining bar stops 23 whereby the resilience of the spring steel from which the chassis is formed causes the chassis to be drawn out as the retaining bar is pushed into place but immediately snaps shut once the retaining bar is pushed passed the stops so as to allow the retaining bar to function through its normal arc movement against the retaining bar bias 18. In an analogous manner, the release means can be readily fitted to the chassis by sliding into the pivot slots 14 corresponding to the keeper pivot 8 with the release means being pushed down passed the stop tabs 24 which again utilise the sloped outward face of the tab to allow the release means to gently draw the chassis apart to allow insertion of the release means which once it has passed the tabs, allow the chassis to return thereby trapping the release means within the chassis configuration. In this manner, the provision of the chassis allows for speedy and efficient assembly of the various components of the trap whilst ensuring the robust and reliable manufacture and design of the trap.

The particular configuration of the release means of the invention is shown as a preferred embodiment only and is not in any way to be deemed limiting to the wide variety of configurations that will be available to provide the release by virtue of the upward force applied to a release means.

The invention is therefore not to be deemed in any way limited to the particularly preferred embodiments shown in the release means or the configuration of the whole trap as shown in the accompanying specification.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A rodent trap comprising:
   a base for mounting trap components,
   a hoop pivotally mounted relative to said base by a hoop pivot and adapted to move between a first set position against a bias and a second released position by the action of said bias,
   a retaining bar pivotally mounted relative to said base at a retaining bar pivot, forward of said hoop when in said set position, for movement between a setting position and a releasing position, and
   a release arrangement comprising an over-centre pivotally mounted keeper adapted for movement between a first retaining position and a second release position, and including a retaining lip,
   said retaining bar including a locking lip formed over said retaining bar pivot and configured to retain said hoop in said first set position when the retaining bar is in said setting position, by simultaneous cooperation with said release arrangement,
   wherein said release arrangement includes a part adapted to mount a bait for the rodent and release said retaining bar when subject to upward force on the bait, and
   wherein said retaining bar is adapted to be automatically set to said setting position by drawing said hoop down onto said retaining bar against said bias so as to cause said retaining bar to engage said retaining lip of said release arrangement and set the trap wherein, in the set position, the retaining lip of the release arrangement rests on top of the retaining bar such that the weight of the keeper maintains the retaining bar in a lowered, set position; wherein an upward force on the bait pivots the release arrangement such that the resultant upward and forward pivotal movement of the keeper releases the retaining bar from its set position; and wherein upon the release of the retaining bar, the resultant forward pivotal movement of the retaining bar and locking lip releases the hoop from its set position.

2. A trap according to claim 1 wherein said retaining lip is provided for cooperating with said retaining bar and a bait mounting arrangement.

3. A trap according to claim 2, wherein said release arrangement in said over-centred first retaining position allows said retaining lip to cooperate with said retaining bar so as to hold said keeper in said first position until an upward force on the bait pivots said keeper toward said second release position.

4. A trap according to claim 1, including a bias arrangement for biasing said retaining bar in said releasing position.

5. A trap according to claim 4, wherein said retaining bar moves through a limited arc stopped at said releasing position to allow said hoop to traverse a notched near end of said retaining bar whilst freely engaging said locking lip.

6. A trap according to claim 1, including a chassis adapted for mounting said hoop, retaining bar and release arrangement wherein said chassis is adapted for fitting to said base.

7. A trap according to claim 6, wherein said chassis includes an integral retaining bar bias.

* * * * *